Figure 1:
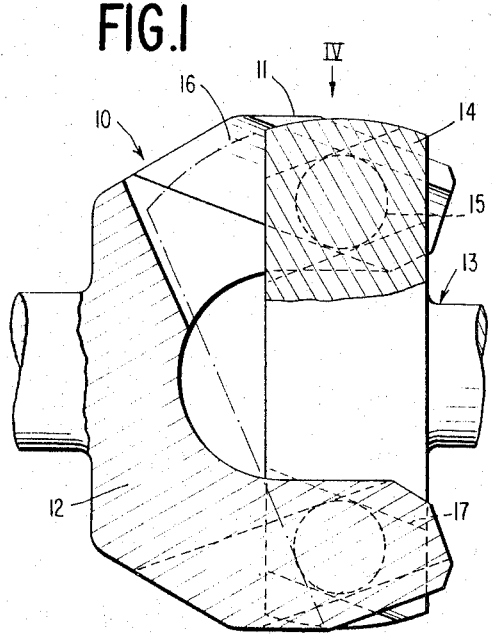

Jan. 17, 1967  W. E. ALTMANN ET AL  3,298,200

SLIDING JOINT

Filed Aug. 13, 1964

INVENTORS
WERNER E. ALTMANN
KURT ENKE
ALFRED F. ROTHWEILER

BY Dicke & Craig
ATTORNEYS

United States Patent Office 3,298,200
Patented Jan. 17, 1967

3,298,200
SLIDING JOINT
Werner E. Altmann, Stuttgart, Kurt Enke, Fellbach, Wurttemberg, and Alfred F. Rothweiler, Esslingen, Hegensberg, Germany, assignors to Daimler-Benz Aktiengesellschaft, Stuttgart-Underturkheim, Germany
Filed Aug. 13, 1964, Ser. No. 389,295
Claims priority, application Germany, Aug. 16, 1963, D 42,254
10 Claims. (Cl. 64—21)

The present invention relates to a synchronously operable sliding joint assembly, especially for the axle-drive of motor vehicles, in which the torque is transmitted by balls which are arranged in mutually crossing tracks of the two joint parts and which are substantially laterally surrounded by these tracks, whereby one of the two joint parts is provided with at least three substantially axially extending arms starting from a flange-like bottom for the accommodation of these ball tracks.

Known in the prior art is a synchronously operable joint of the type described above which is constituted by additional external ball cups or sockets and a central ball for the absorption of axial forces and, therefore, cannot be effective as sliding joint. Even if one omitted with this type of prior art joint the parts and elements serving for the transmission of axial thrusts and thus attempted to convert the same into a sliding joint, it still would retain, as before, the following disadvantages:

(1) Both joint parts are constructed identically so that by reason of the mutual penetration only small bending angles and sliding paths could be realized constructionally.

(2) The planes which form the mutually crossing axes of the ball tracks, extend through the joint axis so that for given values, as for instance, torque and bending angle, a larger overall diameter of the joint is necessary.

The present invention is concerned with the task of creating an improvement in this direction. The present invention solves the underlying problems with joints of the type mentioned above in that the other joint part engages with at least three substantially radially extending arms, starting in a star-like manner from a hub portion, between the arms of the first-mentioned joint part, and in that the common plane of two mutually crossing ball tracks are disposed outside of the joint axis.

The joint constructed in accordance with the present invention retains the self-centering effect achieved already with the prior art joint by reason of the three-armed joint part. Additionally, it is also able to accommodate sliding paths and, with the same transmission of torque, larger bending angles as well as a reduction of the joint diameter may be achieved. The joint only consists of two joint parts and of the balls and can, therefore, be assembled in a simple manner. Furthermore, the manufacture of the individual parts is simple and inexpensive.

It should also be noted in principle that the aforementioned advantages can be achieved and improved by the star-like construction of the inner joint part as well as also by the displacement or offset of the crossing planes. Though the last measure may be known, per se, with other devices, such other prior art points as may use the same are of a completely different type of construction and require by reason of their division into four parts (they have only four balls and a disk-shaped inner joint part) necessarily separate centering means. Consequently, such prior art devices cannot accommodate any sliding paths. Furthermore, the offset has entirely different reasons with such prior art constructions and the interdependence between the same and the joint diameter has not been recognized for such prior art constructions.

With a construction according to the present invention the mutually crossing planes coordinated to the same star-like arm may be disposed parallel to one another. However, it is also within the realm of feasibility by the present invention to take into consideration special requirements by the configurations of these planes deviating therefrom. Thus, for example, the hub of the inner star-like joint part may be reinforced if the crossing planes diverge in the direction toward the joint axis.

The ball cam tracks themselves may extend within the crossing plane either rectilinearly or arcuately. The former results in a particularly simple manufacture. Furthermore, it will be appropriate to taper or bevel off or to round off the star-shaped arms along the lateral surfaces thereof containing the ball cam tracks corresponding to the magnitude of the expected bending angle of the joint.

Accordingly, it is an object of the present invention to provide a synchronously operating sliding joint, especially for the axle drive of motor vehicles, which is simple in construction, easy to assemble, and manufacture, yet eliminates the aforementioned shortcomings and drawbacks encountered with the prior art constructions.

Another object of the present invention resides in the provision of a synchronously operable sliding joint which permits relatively large bending angles and sliding paths.

Still a further object of the present invention resides in the provision of a synchronously operating sliding joint which permits a reduction of the overall diametric dimension thereof for given values of torque transmission and bending angle as compared to the dimensions necessary with the prior art constructions.

A still further object of the present invention resides in the provision of a sliding joint of the type described above which achieves all of the aforementioned advantages while maintaining a self-centering effect without the need for separate structural parts.

Another object of the present invention resides in the provision of a synchronously operable sliding joint which permits due consideration to be given to special requirements in the design of the ball cam tracks.

Figure 2:
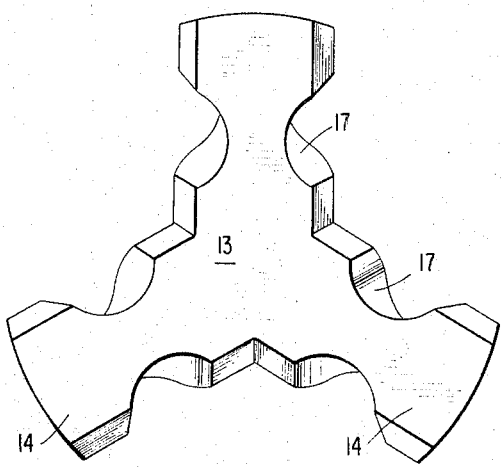
Figure 3:
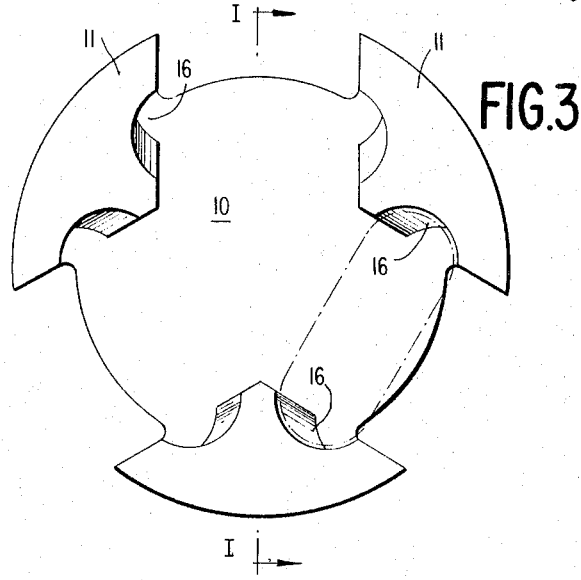
Figure 4:
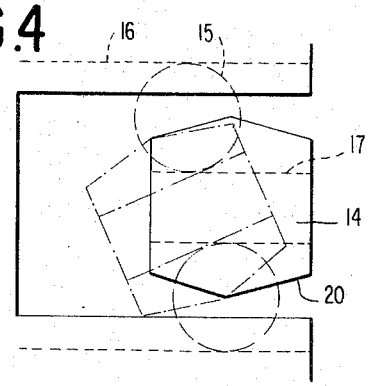
Figure 5:
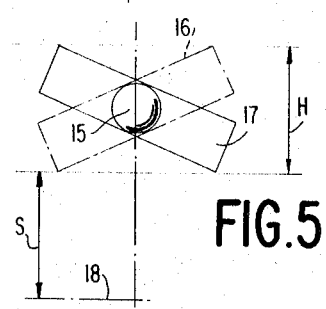
Figure 6:
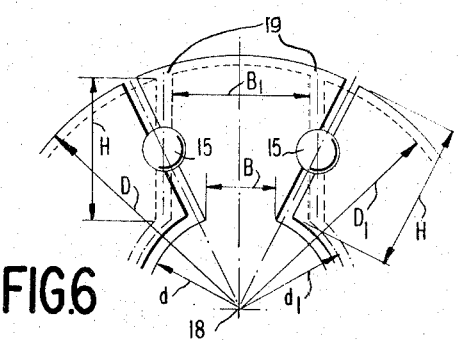

These and further objects, features, and advantages of the present invention will become more obvious from the following description when taken in connection with the accompanying drawing which shows for purposes of illustration only, one embodiment in accordance with the present invention, and wherein FIGURE 1 is a partial axial cross sectional view through a joint in accordance with the present invention, FIGURE 2 is a plan view of the inner joint part in accordance with the present invention, FIGURE 3 is a plan view of the external joint part according to the present invention, FIGURE 4 is a plan view of the joint according to the present invention, taken in the direction of arrow IV of FIGURE 1, with the parts thereof unfolded and developed in a single plane, and FIGURES 5 and 6 are schematic representations explaining the present invention with respect to the offset or displacement of the crossing planes.

Referring now to the drawing wherein like reference numerals are used throughout the various views to designate like parts, and more particularly to FIGURES 1 to 3, the joint illustrated therein comprises an outer joint part generally designated by reference numeral 10 which includes three essentially axially extending arms 11 which start from an approximately flange-like bottom of the joint part 10. The inner joint part generally designated by reference numeral 13 engages between the arms 11 of the outer joint part 10; the three arms 14 of the inner joint part 13 extend from the hub portion in a star-like manner.

Balls 15 are arranged in ball cam tracks 16 and 17 between the two jonit parts 10 and 13 for the transmission of forces. The ball tracks 16 and 17 surround the balls 15 essentially laterally. Both cam tracks 16 and 17 have rectilinear axes extending at an inclination, that is, obliquely to the joint axis. The balls 15 adjust themselves automatically during bending of the joint to the bisecting line of the bending angle as is well known. The axes of the two cam tracks 16 and 17 mutually cross one another and the crossing plane thereof is—as may be readily seen from FIGURES 2 and 3—off set or displaced with respect to the joint axis. The ball cam tracks 16 and 17 may also be provided with a curvature within the crossing planes thereof, that is, may extend, for instance, circularly.

It becomes clear from FIGURE 5, that for purposes of achieving a certain bending angle of the joint and a predetermined axial sliding path for the cam tracks 16 and 17—which are indicated only schematically—a certain height H is necessary. If one now arranged the crossing plane of the ball cam tracks 16 and 17 radially—as is illustrated in FIGURE 6 in full lines—then this results in a certain outer diameter D for the joint, in a certain inner diameter $d$ representing, so to speak of, the thickness of the hub of the joint part 13 and also in a certain width B for the root of the star-shaped arms 14.

According to the present invention it is now possible to off set or displace laterally the crossing plane of the ball cam tracks 16 and 17 with respect to the joint axis 18, which one may imagine in such a manner that one swings or pivots the same parallel to one another about the center points of the ball 15, for example, into the position illustrated in dash lines in FIGURE 6. It may be readily seen from FIGURE 6 without further explanation that with such offset or displacement of crossing planes 19 the required height H remains the same whereas the outer diameter $D_1$ of the joint becomes smaller and the inner diameter $d_1$ larger. This is further enhanced by the fact that in this illustrated position of the crossing plane, only the projection on the joint diameter in question need to be considered for the length of the ball grooves necessary for bending the joint, whereby the grooves may be shortened. Additionally, the width $B_1$ for the root of the star-shaped arms 14 becomes larger. One thus sees that with the same joint values, such as the bending angle and sliding path, more favorable dimensions and a better moment absorption results with the present invention.

In the embodiment described above the crossing planes coordinated to the same star-shaped arm 14 extend according to FIGURES 2 and 3 parallel to one another. However, it is also possible to reinforce the hub of the inner joint part 13 with an inclination of the crossing planes, for example, in such a manner that they diverge toward the joint axis. Also the reverse inclination is within the scope of the present invention.

The joint in accordance with the present invention may be manufactured and assembled in a very simple manner. Thus, for example, it is possible to manufacture each cam track 16 and 17 with one deforming tool. With the illustrated parallel location and arrangement of the crossing planes, it is also possible to make in the same operation and with the same work tool both cam tracks 16 in the outer joint part 10 as is schematically indicated in FIGURE 3 by the dot and dash line.

FIGURE 4 clearly indicates that the star-shaped arms 14 of the inner joint part 13 are provided with beveled off faces 20 along the lateral surfaces thereof. A larger bending angle can be realized thereby as can be readily recognized from the position of the inner joint part shown in dash and dot lines.

While we have shown and described only one embodiment in accordance with the present invention, it is understood that the same is not limited thereto but is susceptible of numerous changes and modification as known to a person skilled in the art and we, therefore, do not wish to be limited to the details shown and described herein but intend to cover all such changes and modifications as are encompassed by the scope of the appended claims.

We claim:
1. A sliding joint, especially for the axle drive of motor vehicles, in which the torque is transmitted by balls, comprising:
   a first joint part including at least three approximately axially extending arm portions starting from a flange-like bottom thereof,
   a second joint part having a hub portion and at least three approximately radially extending arm portions starting from said hub portion thereof in a star-like manner and engaging with the arm portions thereof between the arm portions of said first joint part,
   mutually crossing track means being provided in the arm portions of the two joint parts,
   and balls within said track means, said track means at least partly laterally surrounding said balls,
   said joint, including said first joint part and said second joint part having a common joint axis,
   and the common plane of two mutually crossing track means being disposed outside said joint axis.

2. A sliding joint, especially for the axle drive of motor vehicles, in which the torque is transmitted by balls, comprising:
   a first joint part including at least three approximately axially extending arm portion starting from a flange-like bottom thereof,
   a second joint part having a hub portion and at least three approximately radially extending arm portions starting from said hub portion thereof in a star-like manner and engaging with the arm portions thereof between the arm portions of said first joint part,
   mutually crossing track means being provided in the arm portions of the two joint parts,
   and balls within said track means, said track means at least partly laterally surrounding said balls,
   said joint, including said first joint part and said second joint part having a common joint axis,
   and the common plane of two mutually crossing track means being disposed outside said joint axis,
   the two crossing planes coordinated to a respective star-shaped arm portion of said second joint part being disposed parallel to one another.

3. A sliding joint, especially for the axle drive of motor vehicles, in which the torque is transmitted by balls, comprising:
   a first joint part including at least three approximately axially extending arm portions starting from a flange-like bottom thereof,
   a second joint part having a hub portion and at least three approximately radially extending arm portions starting from said hub portion thereof in a star-like manner and engaging with the arm portions thereof between the arm portions of said first joint part,
   mutually crossing track means being provided in the arm portions of the two joint parts,
   and balls within said track means, said track means at least partly laterally surrounding said balls,
   said joint, including said first joint part and said second joint part having a common joint axis,
   and the common plane of two mutually crossing track means being disposed outside said joint axis,
   the axes of said track means extending rectilinearly.

4. A sliding joint, especially for the axle drive of motor vehicles, in which the torque is transmitted by balls, comprising:
   a first joint part including at least three approximately axially extending arm portions starting from a flange-like bottom thereof,
   a second joint part with at least three approximately radially extending arm portions starting from the hub portion thereof in a star-like manner and engaging with the arm portions thereof between the arm portions of said first joint part, mutually crossing track means being provided in the arm portions of the two joint parts, and balls within said track means, said track means at least partly laterally surrounding said balls, said joint, including said first joint part and said second joint part having a common joint axis, and the common plane of two mutually crossing track means being disposed outside said joint axis, and the star-shaped arm portions of said second joint part being cut off along the lateral surfaces containing the track means to an extent corresponding to the magnitude of the bending angle of the joint.

5. A sliding joint according to claim 4, wherein said lateral surfaces are beveled off.

6. A sliding joint according to claim 4, wherein said lateral surfaces are rounded off.

7. A sliding joint, comprising:

first joint means having an axis of rotation including at least three approximately axially extending arm portions, second joint means having an axis of rotation which extends between said first joint means and includes a hub portion and at least three arm portions, the longitudinal axes of said arm portions extending approximately radially from said hub portion, means for transmitting torque between and first and second joint means in such a manner as to enable relative sliding and bending movements therebetween substantially without loss in transmission of torque including a plurality of balls and mutually crossing ball track means in said arm portions which enclose therebetween at least partially said balls.

8. A sliding joint, especially for the axle drive of motor vehicles, in which the torque is transmitted by balls, comprising:

a first joint part including at least three approximately axially extending arm portions starting from a flange-like bottom thereof, a second joint part with at least three approximately radially extending arm portions starting from the hub portion thereof in a star-like manner and engaging with the arm portions thereof between the arm portions of said first joint part, mutually crossing track means being provided in the arm portions of the two joint parts, and balls within said track means, said track means at least partly laterally surrounding said balls, said joint, including said first joint part and said second joint part having a common axis, and the common plane of two mutually crossing track means being disposed outside said joint axis, the two crossing planes coordinated to a respective star-shaped arm portion of said second joint part being disposed substantially parallel to one another, the axes of the track means extending rectilinearly.

9. A sliding joint, especially for the axle drive of motor vehicles, in which the torque is transmitted by balls, comprising:

a first joint part including at least three approximately axially extending arm portions starting from a flange-like bottom thereof.

a second joint part with at least three approximately radially extending arm portions starting from the hub portion thereof in a star-like manner and engaging with the arm portions thereof between the arm portions of said first joint part, mutually crossing track means, said track means at least partly laterally surrounding said balls, said joint, including said first joint part and said second joint part having a common joint axis, and the common plane of two mutually crossing track means being disposed outside said joint axis, the two crossing planes coordinated to a respective star-shaped arm portion of said second joint part being disposed substantially parallel to one another, the axes of the track means extending rectilinearly, and the star-shaped arm portions of said second joint part being cut off along the lateral surfaces containing the track means to an extent corresponding to the magnitude of the bending angle of the joint.

10. A sliding joint, comprising:

first joint means having an axis of rotation including at least three approximately axially extending arm portions, second joint means having an axis of rotation which extends between said first joint means and includes a hub portion and at least three arm portions, the longitudinal axes of said last-named arm portions extending approximately radially from said hub portion, means for transmitting torque between said first and second joint means in such a manner as to enable relative sliding and bending movements therebetween substantially without loss in transmission of torque including a plurality of balls and mutually crossing ball track means in said arm portions which enclose therebetween at least partially said balls, and the common plane of two mutually crossing track means lying outside of the axes of said first and second joint means.

References Cited by the Examiner

UNITED STATES PATENTS

| 1,769,762 | 7/1930 | Weiss | 64—9 |
| 1,886,847 | 11/1932 | Tenney et al. | 64—9 |
| 2,538,546 | 1/1951 | Wildhaber | 64—9 |
| 2,762,211 | 9/1956 | Bellomo | 64—21 |
| 2,914,931 | 12/1959 | Devos | 64—21 |

FRED C. MATTERN, JR., *Primary Examiner.*

HALL C. COE, *Examiner.*